United States Patent
Eckert et al.

[11] 3,892,806
[45] July 1, 1975

[54] REACTION PRODUCTS OF ε-CAPROLACTAM WITH ALKYLENE DIAMINES

[75] Inventors: Hans-Werner Eckert, Dusseldorf; Gunter Koppensteiner, Hilden, both of Germany

[73] Assignee: Henkel & Cie, GmbH, Dusseldorf, Germany

[22] Filed: Apr. 20, 1973

[21] Appl. No.: 352,981

[52] U.S. Cl. ............... 260/561 A; 71/67; 424/320
[51] Int. Cl.² ............................................ C07C 103/00
[58] Field of Search ............................. 260/561 A

[56] References Cited
UNITED STATES PATENTS

| | | | |
|---|---|---|---|
| 2,327,119 | 8/1943 | Martin | 260/561 A X |
| 2,689,239 | 9/1954 | Melamed | 260/850 X |
| 2,720,508 | 10/1955 | Melamed | 260/77.5 |
| 2,756,257 | 7/1956 | Stamatoff | 260/561 A |
| 2,817,646 | 12/1957 | Payne | 260/561 A X |

FOREIGN PATENTS OR APPLICATIONS

| | | | |
|---|---|---|---|
| 1,154,625 | 9/1963 | Germany | 260/77.5 |
| 1,162,553 | 2/1964 | Germany | 260/77.5 |

OTHER PUBLICATIONS

Chem. Abstracts – 55:27974i.
Chem. Abstracts – 55:27975d.

*Primary Examiner*—Lewis Gotts
*Assistant Examiner*—Ethel G. Love
*Attorney, Agent, or Firm*—Hammond & Littell

[57] ABSTRACT

Reaction products of ε-caprolactam with N-alkylalkylene diamines of the formula

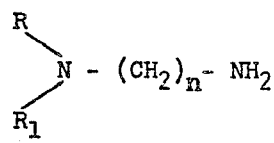

wherein R denotes a straight- or branch-chained, saturated or unsaturated aliphatic hydrocarbon substituent with 10 to 18 carbon atoms, $R_1$ denotes hydrogen or an aliphatic hydrocarbon substituent with 1 to 4 carbon atoms, where $n$ is an integer of from 2 to 6, preferably 3, and where the molar ratio of the reaction partners N-alkylalkylene diamine: ε-caprolactam is 1:1 to 1:10, and the reaction is carried out for 3 to 20 hours in the liquid phase at temperatures above 180°C, preferably at about 250°C. These reaction products are useful in compositions to prevent the growth of microorganisms, such as bacteria, fungi and algae.

6 Claims, No Drawings

REACTION PRODUCTS OF ε-CAPROLACTAM WITH ALKYLENE DIAMINES

Objects of the Invention

It is an object of the present invention to provide a reaction product of ε-caprolactam with an N-alkylalkylene diamine of the formula

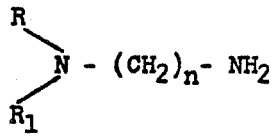

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and $n$ is an integer from 2 to 6, with the molar ratio of N-alkylalkylene diamine to ε-caprolactam ranging from 1:1 to 1:10; said reaction being carried out for 3 to 20 hours in the liquid phase at temperatures above 180°C, as well as to provide a method of producing these reaction products.

It is another object of the present invention to provide an antimicrobial and algicidal composition active against gram-positive bacteria, gram-negative bacteria, fungi and algae containing from 0.1 to 10% by weight of a reaction product of ε-caprolactam with an N-alkylalkylene diamine of the formula

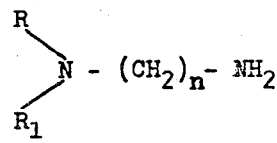

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and $n$ is an integer from 2 to 6, with the molar ratio of N-alkylalkylene diamine to ε-caprolactam ranging from 1:1 to 1:10; said reaction being carried out for 3 to 20 hours in the liquid phase at temperatures above 180°C, and the remainder of an inert carrier.

It is a further object of the present invention to provide a process for the prevention of the growth of microorganisms selected from the group consisting of gram-positive bacteria, gram-negative bacteria, fungi and algae which consists essentially of contacting said microorganisms with an amount effective to prevent the growth of said microorganisms of a reaction product of ε-caprolactam with an N-alkylalkylene diamine of the formula

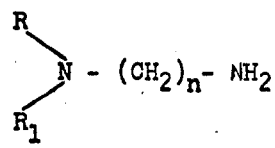

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkyldienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and n is an integer from 2 to 6, with the molar ratio of N-alkylalkylene diamine to ε-caprolactam ranging from 1:1 to 1:10; said reaction being carried out for 3 to 20 hours in the liquid phase at temperatures above 180°C.

These and other objects of the present invention will become apparent as the description thereof proceeds.

Description of the Invention

The present invention concerns new reaction products of ε-caprolactam with N-alkylalkylene diamines of the formula

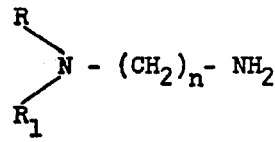

where R denotes a straight- or branch-chained, saturated or unsaturated aliphatic hydrocarbon substituent with 10 to 18 carbon atoms, $R_1$ denotes hydrogen or an aliphatic hydrocarbon substituent with 1 to 40 carbon atoms, where n is an integer of from 2 to 6, preferably 3, and where the molar ratio of the reaction partners N-alkylalkylene diamine : ε-caprolactam is 1:1 to 1:10, and the reaction is carried out for 3 to 20 hours in the liquid phase at temperatures above 180°C, preferably at about 250°C.

More particularly, the present invention provides a reaction product of ε-caprolactam with an N-alkylalkylene diamine of the formula

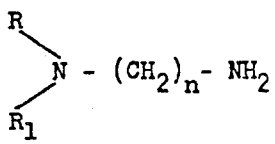

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and n is an integer from 2 to 6, with the molar ratio of N-alkylalkylene diamine to ε-caprolactam ranging from 1:1 to 1:10; said reaction being carried out for 3 to 20 hours in the liquid phase at temperatures above 180°C.

The present invention preferably provides a reaction product of ε-caprolactam with N-alkyl-1,3-propylene diamines of the formula RHN — $(CH_2)_3$ — $NH_2$, wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, with the molar ratio of N-alkyl-1,3-propylene diamine to ε-caprolactam ranging from 1:1 to 1:5; said reaction being carried out for 3 to 20 hours in the liquid phase at a temperature above 180°C.

The present invention further provides a method for the production of a reaction product of ε-caprolactam with the above N-alkylalkylene diamines which consists in reacting said N-alkylalkylene diamines with ε-caprolactam in a molar ratio of 1:1 to 1:10, for 3 to 20 hours in the liquid phase at a temperature above 180°C; and recovering said reaction product.

The present invention is further directed to an antimicrobial and algicidal composition active against gram-positive bacteria, gram-negative bacteria, fungi and algae consisting of from 0.1 to 10% by weight of the above reaction products of ε-caprolactam with an N-alkylalkylene diamine, and the remainder of an inert carrier.

The present invention is additionally directed to a process for the prevention of the growth of microorganisms selected from the group consisting of gram-positive bacteria, gram-negative bacteria, fungi and algae which consists essentially of contacting said microorganisms with an amount effective to prevent the growth of said microorganisms of the above reaction products of ε-caprolactam with an N-alkyl-alkylene diamine.

The production of the products according to the invention is preferably effected in the melt by heating a mixture defined by the above mentioned ratio of the reaction partners of predried ε-caprolactam and freshly distilled N-alkylalkylene diamine to about 250°C, using reaction times between 3 and 20 hours. The reaction products are obtained as water-clear thinly liquid melts which solidify after cooling to white, solid bodies which are difficultly soluble in water and organic solvents, and which can be used without further purification after corresponding grinding. Optionally the reaction can also be carried out in the presence of high-boiling inert solvents.

On the basis of their method of production and based upon the analogy to the reaction products of ε-caprolactam with alkylamines, as described in the prior art, such as German patent application P 19 20 492.3, the reaction products can be considered as an oligomer mixture having the probable structural formula:

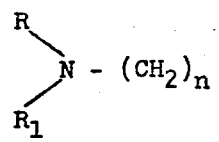
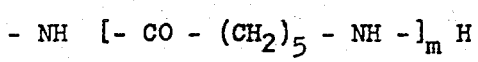

where R, $R_1$ and $n$ have the above defined meaning and m can be an integer from 1 to 10. However the present invention is not to be deemed limited exclusively to this structure.

The N-alkylalkylene diamines used as starting materials represent products which are known in the literature. They can be obtained, for example, by selective alkylation of corresponding diamines or by the reaction of alkylamines with acrylonitrile and subsequent hydrogenation (Houben-Weyl, Methoden der organischen Chemie, 4th ed. Vol. 11/1, p. 564; and French Pat. No. 1,351,793). Of particular importance as starting amines are the N-alkyl-1,3-propylene diamines, since the reaction products with ε-caprolactam have particularly valuable properties; and these diamines are furthermore readily available. These readily available diamines are substantially those whose alkyl radicals are preferably straight-chained, saturated or unsaturated, and whose alkyl radicals are obtained from the corresponding fatty acids, for example alkanoic acids of 10 to 18 carbon atoms such as lauric acid, myristic acid, palmitic acid and stearic acid; hydroxyalkanoic acids of 10 to 18 carbon atoms such as hydroxystearic acid; alkenoic acids of 10 to 18 carbon atoms such as oleic acid and mixed palmitic-oleic acid; hydroxyalkenoic acids of 10 to 18 carbon atoms such as ricinoleic acid; alkadienoic acids of 10 to 18 carbon atoms such as linoleic acid; alkatrienoic acids of 10 to 18 carbon atoms such as linolenic acid; and mixtures of fatty acids of 10 to 18 carbon atoms, such as obtained from coconut fat, tallow, soybean oil, linseed oil, palm oil, colza oil, and rape seed oil, fish oil and whale oils, as well as their hydrogenation products.

The reaction products of ε-caprolactam with N-alkyl alkylene-diamines according to the invention have very good microbiostatic and microbicidal effects against gram-positive and gram-negative bacteria and fungi, and in addition they have an excellent inhibiting effect on algae. Their good physiological tolerability makes them furthermore suitable for use as antimicrobial substances in various fields of application.

The amount of the antimicrobial and algicidal agents in the compositions to be used in accordance with the invention may vary from 0.1 to 10% by weight, preferably from 0.5 to 5% by weight, and especially from 0.1 to 2% by weight.

The amount of the antimicrobial, antifungal and algicidal reaction products of the invention required for inhibiting the growth of the microorganisms varies from 0.1 to 500 parts per million.

With respect to the antimicrobial action, those reaction products which have proved particularly suitable are those derived from N-alkylalkylene diamines of the above-mentioned formula, whose alkyl radical contains 12 to 14 carbon atoms and where $R_1$ denotes hydrogen. Furthermore it was found advantageous with regard to the antimicrobial properties if the molar ratio of the N-alkylalkylene diamine to the ε-caprolactam is 1:1 to 1:5, in the reaction products, and preferably 1:1 to 1:3. As mentioned above, those reaction products which are of particular importance, are those derived from N-alkylalkylene diamines of the above mentioned formula where $n=3$, that is, derived from N-alkyl-1,3-propylene diamines.

Examples of reaction products according to the invention include the reaction products of ε-caprolactam with various N-alkylalkylene diamines in the ratio of lactam to diamine as follows: N-dodecyl-1,2-ethylene diamine 5:1, N-coconut fatty alkyl-1,2-ethylene diamine 3:1, N-dodecyl-N-ethyl-1,3-propylene diamine 3:1, N-decyl-1,4-butylene diamine 2:1, N-tallow fatty alkyl-1,4-butylene diamine 10:1, N-dodecyl-1,5-pentylene diamine 5:1, N-tetradecyl-1,6-hexylene diamine 3:1, and N-hexadecyl-1,6-hexylene diamine 4:1. Preferred are those with N-decyl-1,3-propylene diamine 3:1, N-dodecyl-1,3-propylene diamine 1:1, N-dodecyl-1,3-propylene diamine 2:1, N-dodecyl-1,3-propylene diamine 4:1, N-dodecyl-1,3-propylene diamine 5:1, N-coconut fatty alkyl-1,3-propylene diamine 3:1, N-coconut fatty alkyl-1,3-propylene diamine 1:1, N-coconut fatty alkyl-1,3-propylene diamine 2:1, N-tetradecyl-1,3-propylene diamine 3:1, N-hexadecyl-1,3-propylene diamine 3:1, N-octadecyl-1,3-propylene diamine 3:1, N-tallow fatty alkyl-1,3-propylene diamine 3:1, and N-hardened tallow fatty alkyl-1,3-propylene diamine 3:1.

The following examples are merely illustrative of the present invention without being deemed limitative in any manner thereof.

EXAMPLE 1

In order to test the antimicrobial and algicidal action, a number of reaction products first were produced according to the following method.

A mixture of dried $\epsilon$-caprolactam and N-alkyl-1,3-propylene diamine in the provided molar ratio was heated to 250°C while vigorously being stirred under an atmosphere of dry nitrogen. The mixture was then left standing at this temperature for 3 to 20 hours. After the reaction was completed, a vacuum was applied for one-half hour, in some cases, so as to distill off the unreacted N-alkyl-1,3-propylene diamine. The reaction products obtained were water-clear, thinly liquid melts which solidified after cooling to white solid bodies. These products were ground to powders without further purification and were used for the tests. Although these products are difficultly soluble in water and organic solvents, their solubility is sufficient in regard of the small amounts which are necessary for this special use. In the following Table 1 are compiled the substances produced, identified by their alkyl radical, by the molar ratio of the reactants, by the reaction time in hours by the vacuum applied in hours, if necessary, to remove unreacted diamine, and analytical data:

EXAMPLE 2

The antimicrobial activity of the reaction products of $\epsilon$-caprolactam with N-alkyl-1,3-propylene diamines listed in Table 1 above was determined by measuring each product's inhibiting effect on the following test organisms:

1. Staphylococcus aureus $5 \times 10^7$ organisms per ml
2. Escherichia coli $4 \times 10^7$ organisms per ml
3. Pseudomonas aeruginosa $4 \times 10^7$ organisms per ml
4. Candida albicans $2 \times 10^6$ organisms per ml
5. Aspergillus niger $9 \times {}^5$ organisms per ml
6. Pencillium camerunense $9 \times 10^5$ organisms per ml
7. Aerobacter aerogenus $5 \times 10^7$ organisms per ml The inhibiting concentrations of the individual substances were determined using the so-called "plate test." This test constitutes a modified form of the dilution test for determining the microbiostatic effect as described in the method for testing chemical disinfectants by the German Society for Hygiene and Microbiology (1959), under the methods of preliminary evaluations of such materials, and can be used to advantage in different tests not utilizing the liquid nutrient media stated in the said directives. The advantage of solid nutrient media is obvious, particularly when testing the efficacy of substances with respect to fungi.

The desired test concentrations were produced by mixing measured quantities of solutions of suitable concentrations of the test substances with measured quantities of liquified brothagar or beer wort-agar in sterile Petri dishes. Merck Standard I broth-agar or wort-agar (8° Bg) was always used. The quantities of the substance solutions measured by means of a pipette were 0.1 ml, and tht total volume in the Petri dishes amounted to 10 ml after mixing with the nutrient medium. After the nutrient medium had solidified, the surface was injected with the test suspension of organisms in broth or wort which contained the above-mentioned concentration of organisms per ml. Incubation was effected for 3 days at 37°C for bacteria and was effected for 6 days at 30°C for fungi in an incubator. Subsequently it was determined which substance concentration incorporated in the nutrient medium could fully inhibit the growth of the organisms. The value thus determined was designated the "minimum inhibiting concentration" (m.i.c.). The tests were carried out in the following intervals of concentration:
5,000 ppm, 2,500 ppm, 1,000 ppm, 750 ppm, 500 ppm, 250 ppm, 100 ppm, 50 ppm, 25 ppm, 10 ppm, 5 ppm and 1 ppm.

The results are compiled below in Table 2:

TABLE 1

| Substance | Alkyl radical | N-alkyl-1,3-propylene diamine $\epsilon$-caprolactam ratio | Reaction time hours | Vacuum time hours | $N_{kj}$ % | $N_{titr.}$ % |
|---|---|---|---|---|---|---|
| A | Decyl | 1 : 3 | 20 | 0 | 12.26 | 4.25 |
| B | Dodecyl | 1 : 1 | 5 | 0.5 | 11.80 | 7.10 |
| C | Dodecyl | 1 : 1.5 | 5 | 0.5 | 11.68 | 6.10 |
| D | Dodecyl | 1 : 2 | 5 | 0.5 | 11.11 | 5.42 |
| E | Dodecyl | 1 : 2.5 | 5 | 0.5 | 11.01 | 4.81 |
| F | Dodecyl | 1 : 3 | 20 | 0 | 11.16 | 4.70 |
| G | Dodecyl | 1 : 4 | 5 | 0.5 | 11.67 | 3.72 |
| H | Dodecyl | 1 : 5 | 20 | 0 | 11.63 | 3.20 |
| J | Coconut fatty alkyl | 1 : 3 | 20 | 0 | 11.02 | 4.60 |
| K | Tetradecyl | 1 : 3 | 20 | 0 | 10.80 | 4.35 |
| L | Hexadecyl | 1 : 3 | 20 | 0 | 10.50 | 4.10 |
| M | Tallow fatty alkyl | 1 : 3 | 20 | 0 | 9.92 | 3.70 |
| N | Hardened tallow fatty alkyl | 1 : 3 | 20 | 0 | 10.11 | 3.84 |
| O | Octadecyl | 1 : 3 | 20 | 0 | 9.90 | 3.80 |

TABLE 2

Inhibiting concentration of the products A to O in ppm.

| Substance | Test Organism used | | | | | | |
|---|---|---|---|---|---|---|---|
| | 1 | 2 | 3 | 4 | 5 | 6 | 7 |
| A | 50 | —* | 250 | 250 | — | — | — |
| B | 10 | 10 | 10 | 100 | — | — | 10 |
| C | 10 | 10 | 10 | 50 | — | — | 10 |
| D | 10 | 10 | 10 | 50 | — | — | 10 |
| E | 10 | 10 | 50 | 50 | — | — | 10 |
| F | 5 | 10 | 50 | 25 | 100 | 100 | 10 |
| G | 10 | 10 | 50 | 100 | — | — | 10 |
| H | 5 | 10 | 100 | 1000 | — | — | 10 |
| J | 25 | 25 | 250 | 50 | 250 | 250 | — |
| K | 10 | 25 | 100 | 50 | 250 | 250 | — |
| L | 10 | 50 | 250 | 50 | — | — | — |
| M | 25 | 50 | 500 | 100 | 500 | 250 | — |
| N | 10 | 25 | 500 | 50 | 500 | 250 | — |
| O | 10 | 50 | 250 | 100 | — | — | — |

*"—" indicates that no tests were made.

The table indicates the unexpectedly superior inhibiting activity of the products according to the present invention against gram-positive bacteria, gram-negative bacteria and fungi.

EXAMPLE 3

The microcidal activity of many of the reaction products listed in Example 1 was determined by means of the suspension test. The procedure for this testing method is described in the method for the testing of chemical disinfectants published by the German Society for Hygiene and Microbiology (1959), under the methods of preliminary evaluations of such materials. According to these procedures 0.1 ml test organism suspension of the following bacteria and fungi were pipetted into test tubes at a temperature of 18°C to 21°C.

1. Staphylococcus aureus 5 × $10^7$ organisms per ml
2. Escherichia coli 4 × $10^7$ organisms per ml
3. Pseudomonas aeruginosa 4 × $10^7$ organisms per ml
4. Candida albicans 2 × $10^6$ organisms per ml
5. Aspergillus niger 9 × $10^5$ organisms per ml
7. Aerobacter aerogenus 5 × $10^7$ organisms per ml Each 0.1 ml portion of the above test organism suspensions was diluted to 10 ml, first on the one hand with tap water containing the products of the invention to be tested (16°German hardness); and secondly on the other hand, in a solution buffered to pH of 10 (boric acid-potassium chloride-sodium hydroxide-buffer). The concentrations of the products according to the invention were 100 ppm and 250 ppm. After reaction times of 1, 2.5, 5, 10, 20, 30 and 60 minutes a dropper-full of material was taken from the test tubes and pipetted into 10 ml nutrient solution which contained 3% Tween 80 and 0.3% lecithin as de-inhibitors. The nutrient solutions inoculated with bacteria were incubated at 37°C, while those inoculated with fungi were incubated at 30°C, in an incubator. After 6 days the cultures were evaluated macroscopically for growth of the test organisms; and the sterilization times were then determined. The results are compiled in Table 3.

TABLE 3

Sterilization times of the products according to the invention with regard to the various test organisms, in minutes:

| Substance | Organism | Concentration of the products | | | |
|---|---|---|---|---|---|
| | | in buffer pH 10 | | in tap water | |
| | | 100 ppm | 250 ppm | 100 ppm | 250 ppm |
| | | Times in minutes | | | |
| B | 1 | 1 | 1 | 1 | 1 |
| | 2 | 1 | 1 | 10 | 5 |
| | 3 | 2.5 | 1 | 5 | 1 |
| | 4 | 2.5 | 1 | 20 | 5 |
| | 7 | —* | — | 2.5 | 2.5 |
| C | 1 | 1 | 1 | 1 | 1 |
| | 2 | 2.5 | 1 | 20 | 2.5 |
| | 3 | 5 | 1 | 30 | 10 |
| | 4 | 2.5 | 2.5 | 5 | 2.5 |
| D | 1 | 1 | 1 | 2.5 | 1 |
| | 2 | 1 | 1 | 20 | 5 |
| | 3 | 5 | 2.5 | 20 | 10 |
| | 4 | 2.5 | 2.5 | 10 | 2.5 |
| | 7 | — | — | 10 | 2.5 |
| E | 1 | 1 | 1 | 2.5 | 1 |
| | 2 | 10 | 2.5 | 60 | 5 |
| | 3 | 5 | 1 | 30 | 10 |
| | 4 | 5 | 2.5 | 30 | 2.5 |
| F | 1 | 1 | 1 | 1 | 1 |
| | 2 | 5 | 2.5 | 5 | 1 |
| | 3 | 5 | 1 | 2.5 | 1 |
| | 4 | 2.5 | 2.5 | 1 | 1 |
| | 5 | 5 | 2.5 | 1 | 1 |
| | 7 | — | — | 20 | 5 |
| J | 1 | 1 | 1 | 2.5 | 1 |
| | 2 | 2.5 | 1 | 10 | 5 |
| | 3 | 1 | 1 | 30 | 5 |
| | 4 | 2.5 | 2.5 | 10 | 1 |
| | 5 | 5 | 5 | 30 | 20 |
| K | 1 | 5 | 5 | 10 | 10 |
| | 3 | 10 | 5 | 30 | 20 |
| | 4 | 5 | 2.5 | 10 | 5 |
| L | 1 | — | — | 2.5 | 2.5 |
| | 3 | — | — | 10 | 5 |
| | 4 | — | — | 2.5 | 2.5 |

*"—" indicates that no tests were made.

The foregoing table clearly indicates the unexpectedly superior sterilization activity of the reaction products according to the invention with regard to gram-positive bacteria, gram-negative bacteria and fungi.

EXAMPLE 4

The algae inhibiting activity of the products of the invention was determined by means of a dilution test. The test organisms were the following algae:

1. Chlorella pyrenoidosa
2. Scenedesmus obliquus

Test solutions of the products of the invention in concentrations of 50 ppm, 25 ppm, 20 ppm, 10 ppm, 7.5 ppm, 5 ppm, 2.5 ppm, 1 ppm and 0.5 ppm were pipetted into 200 ml petri dishes, and each was inoculated with a 5 ml suspension of the above algae and incubated for 4 weeks at 25°C. After 2 weeks an interim check was made and the inoculation was repeated with a 5 ml suspension of the algae which showed no growth in the dishes. The minimum inhibiting concentrations determined in the evaluation after 4 weeks are compiled in Table 4.

TABLE 4

Inhibiting concentrations of some products of the invention with regard to algae.

| Substance | Inhibiting concentration in ppm | |
|---|---|---|
| | on alga 1 | on alga 2 |
| F | 0.5 | 1 |
| J | 2.5 | 2.5 |
| K | 5 | 2.5 |
| M | 10 | 10 |
| N | 5 | 10 |

Thus Table 4 indicates that the reaction products of the invention have an unexpectedly superior inhibiting activity on algae.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A reaction product of $\epsilon$-caprolactam with N-alkyl-1,3-propylene diamine of the formula
RHN — $(CH_2)_3$—$NH_2$ wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, with the molar ratio of N-alkyl-1,3-propylene diamine to $\epsilon$-caprolactam ranging from 1:1 to 1:10; said reaction being carried out for 3 to 20 hours in the liquid phase at temperatures above 180°C.

2. The reaction product of claim 1, in which R is alkyl of 12 to 14 carbon atoms, and said molar ratio is from 1:1 to 1:5; said reaction being conducted at about 250°C.

3. The reaction product of claim 1, in which said molar ratio is 1:1 to 1:3.

4. The reaction product of claim 1, in which R is alkyl of 12 to 14 carbon atoms, said molar ratio is from 1:1 to 1:3, and said reaction being carried out at about 250°C.

5. The reaction product of claim 1, in which R is selected from the group consisting of decyl, dodecyl, coconut fatty alkyl, tetradecyl, hexadecyl, tallow fatty alkyl, hardened tallow fatty alkyl, and octadecyl.

6. The reaction product of claim 1, which is RHN—($CH_2)_3$—NH[-CO-$(CH_2)_5$-NH-$]_m$ H, wherein R has the same meanings as in claim 1, and $m$ is an integer from 1 to 10.

* * * * *

UNITED STATES PATENT OFFICE
CERTIFICATE OF CORRECTION

Patent No. 3,892,806          Dated July 1, 1975

Inventor(s)  Hans-Werner Eckert and Gunter Kippensteiner

It is certified that error appears in the above-identified patent and that said Letters Patent are hereby corrected as shown below:

IN THE PATENT

In the Heading, between [21] and [52], please insert:
-- [30] Foreign Application Priority Data
    Apr. 24, 1972   Germany ..... 2220016 --

IN THE PATENT APPLICATION

| Column | Line | Page | Line | |
|--------|------|------|------|---|
| 2 | 12 | 2 | 21 | "alkyldienyl" should be -- alkadienyl --. |
| 2 | 41 | 3 | 7 | "40" should be -- 4 --. |
| 6 | 11 | 10 | 10 | "9 x 5" should be -- 9 x $10^5$ --. |

Signed and Sealed this fourth Day of May 1976

[SEAL]

Attest:

RUTH C. MASON
Attesting Officer

C. MARSHALL DANN
Commissioner of Patents and Trademarks